(12) United States Patent
Lockwood

(10) Patent No.: US 8,844,468 B2
(45) Date of Patent: Sep. 30, 2014

(54) AQUARIUM LANDSCAPE SYSTEM

(71) Applicant: Betty June Lockwood, Uvalda, GA (US)

(72) Inventor: Betty June Lockwood, Uvalda, GA (US)

(\*) Notice: Subject to any disclaimer, the term of this patent is extended or adjusted under 35 U.S.C. 154(b) by 58 days.

(21) Appl. No.: 13/753,568

(22) Filed: Jan. 30, 2013

(65) Prior Publication Data

US 2014/0209034 A1 Jul. 31, 2014

(51) Int. Cl.
*A01K 63/00* (2006.01)
*A01K 61/00* (2006.01)
*A01K 63/04* (2006.01)

(52) U.S. Cl.
CPC ............. *A01K 63/006* (2013.01); *A01K 61/003* (2013.01); *A01K 63/042* (2013.01)
USPC .......................................... 119/256; 119/254

(58) Field of Classification Search
CPC .................................................... A01K 63/006
USPC ................................................. 119/253–258
See application file for complete search history.

(56) References Cited

U.S. PATENT DOCUMENTS

| | | | | |
|---|---|---|---|---|
| 2,636,473 A | * | 4/1953 | Schwartz et al. | 119/264 |
| 4,006,711 A | * | 2/1977 | Frank | 119/256 |
| 5,367,985 A | * | 11/1994 | Wilkins | 119/263 |
| 5,564,369 A | * | 10/1996 | Barber et al. | 119/221 |
| 5,667,672 A | * | 9/1997 | Convertino et al. | 210/805 |
| 6,006,471 A | * | 12/1999 | Sun | 47/69 |
| 6,007,713 A | * | 12/1999 | Michalik | 210/167.23 |

\* cited by examiner

*Primary Examiner* — Kimberly Berona
*Assistant Examiner* — Joshua Huson

(57) ABSTRACT

An aquarium landscape system that includes an aquarium that contains a combination of one or more aquatic animals and water, a base gravel mold with a top surface with 4 corners and a plurality of eye hooks that each have a threaded vertical insert portion and a circular eye portion that expose the circular eye portion of the eye hooks above the top surface of the base gravel mold. The system also includes one or more air hose connector valves that perpendicularly protrude from the top surface of the base gravel mold, a plurality of air valves that perpendicularly protrude from the top surface of the base gravel mold, the air valves emit the incoming air received by the air supply source into the aquarium and a pair of removable handles to remove the system from the aquarium for cleaning.

20 Claims, 1 Drawing Sheet

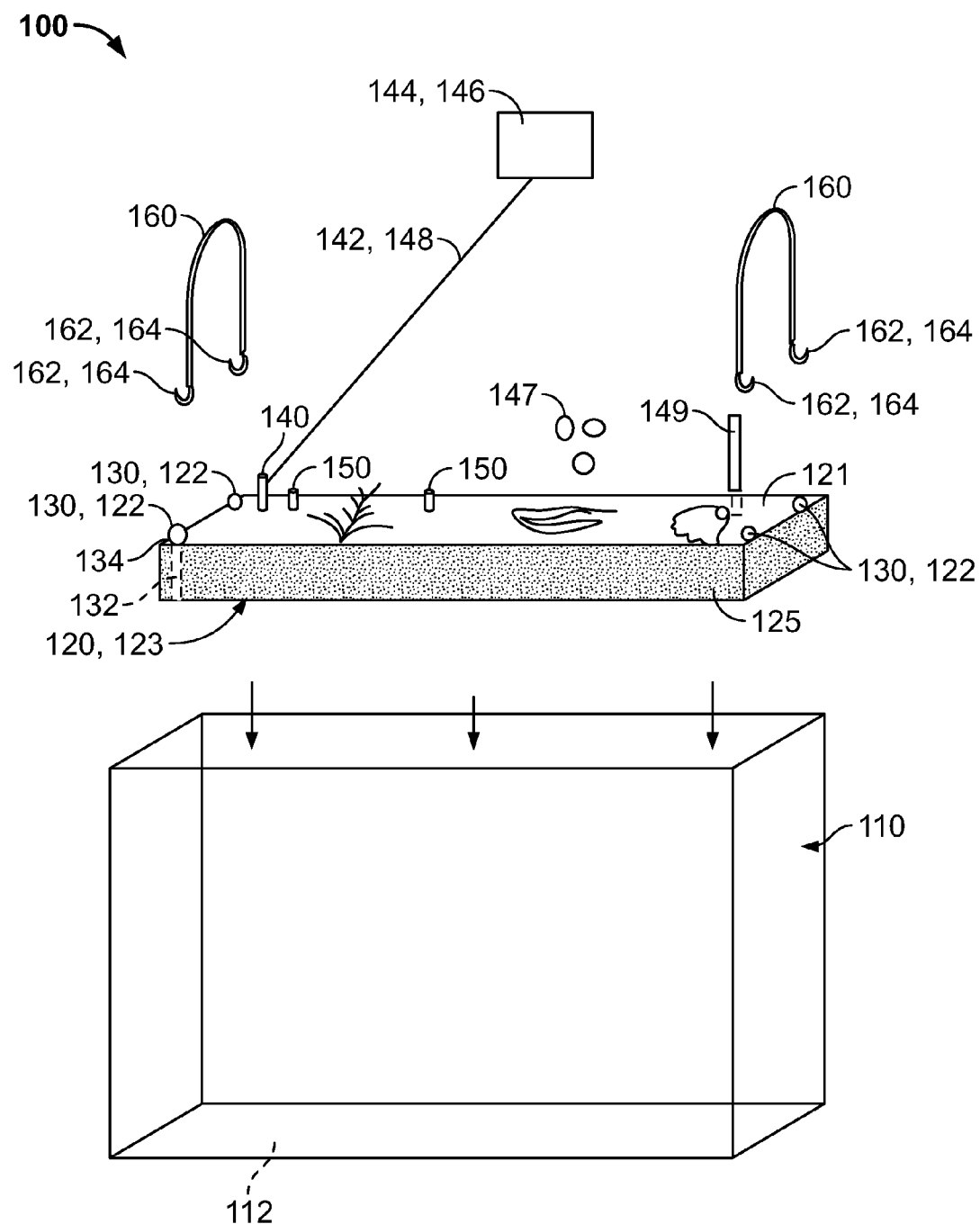

AQUARIUM LANDSCAPE SYSTEM

TECHNICAL FIELD & BACKGROUND

The present invention generally relates to a landscape system. More specifically, the invention is an aquarium landscape system.

Many people purchase rocks and other knick knacks to provide decoration for an aquarium. It can be difficult and time consuming to remove the fish and decorative items from the tank for cleaning on a regular basis.

What is needed is an aquarium landscape system that allows a user to clean the aquarium landscape system relatively more quickly and easily than a traditional aquarium landscape system.

SUMMARY OF THE INVENTION

The present invention is an aquarium landscape system.

It is an object of the invention to provide an aquarium landscape system that is one piece in contrast to a traditional aquarium landscape system that has a plurality of pieces that can be removed relatively easily and quickly from an aquarium to clean the aquarium landscape system.

It is an object of the invention to provide an aquarium landscape system with a plurality of removable handles to relatively quickly and easily remove the aquarium landscape system.

It is an object of the invention to provide an aquarium landscape system that allows a user to clean the aquarium landscape system relatively more quickly and easily from outside the aquarium than a traditional aquarium landscape system.

BRIEF DESCRIPTION OF THE DRAWINGS

The present invention will be described by way of exemplary embodiments, but not limitations, illustrated in the accompanying drawings in which like references denote similar elements, and in which:

FIG. 1 illustrates an exploded front view of an aquarium landscape system, according to an embodiment of the present invention.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is utilized repeatedly. The phrase generally does not refer to the same embodiment, however, it may. The terms "comprising", "having" and "including" are synonymous, unless the context dictates otherwise.

FIG. 1 illustrates an exploded front view of an aquarium landscape system 100, according to an embodiment of the present invention.

The aquarium landscape system 100 includes an aquarium 110, a base gravel mold 120, a plurality of eye hooks 130, one or more air hose connector valves 140, a plurality of air valves 150 and a pair of removable handles 160. The aquarium 110 can be any suitable size aquarium such as an approximate 2.5 gallon aquarium, an approximate 5 gallon aquarium, an approximate 10 gallon aquarium, an approximate 15 gallon aquarium, an approximate 20 gallon aquarium, an approximate 30 gallon aquarium, an approximate 50 gallon aquarium or other suitable sized aquariums. The aquarium 110 can be a selected one of a freshwater aquarium and a salt-water aquarium. The aquarium 110 has a bottom 112 and contains one or more fish or one or more other suitable aquatic animals or combination of aquatic animals and water. The aquarium landscape system 100 can be lifted out of an aquarium 110 and cleaned and then placed back into the aquarium 110. The base gravel mold 120 has a top surface 121 with four corners 122 that has a general rectangular shape 123 to accommodate the aquarium 110. The base gravel mold 120 is removably disposed on the bottom 112 of the aquarium 110 and includes a base mold that contains a plurality of gravel. A liquid non-toxic plastic 125 is poured around the gravel to form the base gravel mold 120. The base gravel mold 120 formed is a dry, solid and one-piece mold. The eye hooks 130 have a threaded vertical insert portion 132 and a circular eye portion 134. The threaded vertical insert portion 132 of the eye hooks 130 is screwed into the top surface 121 and each of the 4 corners 122 of the base gravel mold 120 while exposing the circular eye portion 134 of the eye hooks 130 above the top surface 121 of the base gravel mold 120. The one or more air hose connector valves 140 perpendicularly protrude from the top surface 121 of the base gravel mold 120 to receive an air hose 142 from an air supply source 144 such as an air pump 146 or other suitable air supply source to receive incoming air 148. FIG. 1 illustrates only one air hose connector valve 140. The air valves 150 perpendicularly protrude from the top surface 121 of the base gravel mold 120 and emit the incoming air 148 received by the air supply source 144 into the aquarium 110. The air valves 150 typically emit the incoming air 148 into the aquarium 110 as a plurality of bubbles 147 although the incoming air 148 can be in any suitable form such as a stream of incoming air 149 or a combination of bubbles 147 and a stream of incoming air 149. The bubbles 147 and the stream of incoming air 149 provide aeration to the aquarium to increase the oxygen level of the water in the aquarium 149. The pair of removable handles 160 is generally u-shaped with a pair of ends 162. A pair of clips 164 is disposed on the pair of ends 162 of the pair of removable handles 160 and corresponds to the eye hooks 130 above the top surface 121 of the base gravel mold 120. The pair of clips 164 is releasably engaged with the circular eye portion 134 of the eye hooks 130 above the top surface 121 of the base gravel mold 120 to allow a user to lift the aquarium landscape system 100 out of the aquarium 110 or place the aquarium landscape system 100 into the aquarium 110. The aquarium landscape system 100 is also dishwasher-safe and can be cleaned without damage to a dishwasher (not shown) or the aquarium landscape system 100.

The aquarium landscape system is a one piece unit for landscaping aquariums. Available in a variety of sizes, the aquarium landscape system features a mold that contains a plurality of gravel, a plurality of ornaments and a plurality of other items for decorating an aquarium. Once the landscape has been completed, a liquid non-toxic plastic is poured around the aquarium landscape system to form a dry and solid mold. The back of the aquarium landscape system is readily equipped with a connector for an air hose and an air pump to produce a plurality of air bubbles, a plurality of air streams or a combination of both air bubbles and air streams. At each corner, a plurality of small eye hooks accommodate a plurality of detachable handles that are simply fastened to the aquarium landscape system to lift the aquarium landscape system out of the aquarium to be cleaned. The aquarium landscape system is also dishwasher safe for additional convenience. The aquarium landscape system features a plurality of decorations for fish tanks molded in non-toxic plastic that can be relatively quickly and easily removed and clean-up. The aquarium landscape system is designed to be available in a variety of themes and aesthetic settings, including seasonal motifs for Christmas and Thanksgiving.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

The invention claimed is:

1. An aquarium landscape system, comprising:
   an aquarium with a bottom;
   a molded unitary gravel base with a top surface, the top surface with four corners, the gravel base has a general rectangular shape to accommodate the aquarium; the gravel base is removably disposed on the bottom of the aquarium;
   a plurality of eye hooks that each have a threaded vertical insert portion and a circular eye portion, the threaded vertical insert portion of the eye hooks is screwed into the top surface and each of the four corners of the gravel base while exposing the circular eye portion of the eye hooks above the top surface of the gravel base;
   one or more air hose connector valves that perpendicularly protrude from the top surface of the gravel base, the one or more air hose connector valves receive an air hose from an air supply source to receive incoming air;
   a plurality of air valves that perpendicularly protrude from the top surface of the gravel base, the air valves emit the incoming air received by the air supply source into the aquarium; and
   a pair of removable handles that is generally u-shaped with a pair of ends, a pair of clips is disposed on the pair of ends of the pair of removable handles, the pair of clips corresponds to the eye hooks above the top surface of the gravel base.

2. The aquarium landscape system according to claim 1, wherein the aquarium is a freshwater aquarium.

3. The aquarium landscape system according to claim 1, wherein the aquarium is a salt-water aquarium.

4. The aquarium landscape system according to claim 1, wherein a liquid non-toxic plastic is poured around the gravel to form the gravel base.

5. The aquarium landscape system according to claim 4, wherein the formed gravel base is dry, solid and one-piece.

6. The aquarium landscape system according to claim 1, wherein the air valves emit the incoming air into the aquarium as a plurality of bubbles to provide aeration to the aquarium to increase an oxygen level of the water in the aquarium.

7. The aquarium landscape system according to claim 6, wherein the air valves emit the incoming air into the aquarium as a stream of incoming air to provide aeration to the aquarium to increase the oxygen level of the water in the aquarium.

8. The aquarium landscape system according to claim 1, wherein the pair of clips is releasably engaged with the circular eye portion of the eye hooks above the top surface of the gravel base to allow a user to lift the aquarium landscape system out of the aquarium.

9. The aquarium landscape system according to claim 8, wherein the pair of clips is releasably engaged with the circular eye portion of the eye hooks above the top surface of the gravel base to allow the user to place the aquarium landscape system into the aquarium.

10. The aquarium landscape system according to claim 1, wherein the aquarium landscape system is lifted out of the aquarium and cleaned, the aquarium landscape system is then placed back into the aquarium.

11. An aquarium landscape system, comprising:
    an aquarium with a bottom;
    a molded unitary gravel base with a top surface, the top surface with four corners, the gravel base has a general rectangular shape to accommodate the aquarium, the gravel base is removably disposed on the bottom of the aquarium and a liquid non-toxic plastic is poured around the gravel to form the gravel base;
    a plurality of eye hooks that each have a threaded vertical insert portion and a circular eye portion, the threaded vertical insert portion of the eye hooks is screwed into the top surface and each of the four corners of the gravel base while exposing the circular eye portion of the eye hooks above the top surface of the gravel base;
    one or more air hose connector valves that perpendicularly protrude from the top surface of the gravel base, the one or more air hose connector valves receive an air hose from an air supply source to receive incoming air;
    a plurality of air valves that perpendicularly protrude from the top surface of the gravel base, the air valves emit the incoming air received by the air supply source into the aquarium; and
    a pair of removable handles that is generally u-shaped with a pair of ends, a pair of clips is disposed on the pair of ends of the pair of removable handles, the pair of clips correspond to the eye hooks above the top surface of the gravel base and the pair of clips is releasably engaged with the circular eye portion of the eye hooks above the top surface of the gravel base to allow a user to lift the aquarium landscape system out of the aquarium.

12. The aquarium landscape system according to claim 11, wherein the aquarium is a freshwater aquarium.

13. The aquarium landscape system according to claim 11, wherein the aquarium is a salt-water aquarium.

14. The aquarium landscape system according to claim 13, wherein the formed gravel base is dry, solid and one-piece.

15. The aquarium landscape system according to claim 11, wherein the air valves emit the incoming air into the aquarium as a plurality of bubbles to provide aeration to the aquarium to increase an oxygen level of the water in the aquarium.

16. The aquarium landscape system according to claim 15, wherein the air valves emit the incoming air into the aquarium as a stream of incoming air to provide aeration to the aquarium to increase the oxygen level of the water in the aquarium.

17. The aquarium landscape system according to claim 11, wherein the air supply source is an air pump.

18. The aquarium landscape system according to claim 11, wherein the pair of clips is releasably engaged with the circular eye portion of the eye hooks above the top surface of the gravel base to allow the user to place the aquarium landscape system into the aquarium.

19. The aquarium landscape system according to claim 11, wherein the aquarium landscape system is lifted out of the aquarium and cleaned, the aquarium landscape system is then placed back into the aquarium.

20. The aquarium landscape system according to claim 11, wherein the aquarium landscape system is dishwasher-safe.

\* \* \* \* \*